United States Patent
Porte

(10) Patent No.: US 6,761,245 B2
(45) Date of Patent: Jul. 13, 2004

(54) TUBULAR ACOUSTIC ATTENUATION PIECE FOR AN AIRCRAFT JET ENGINE AIR INTAKE

(75) Inventor: Alain Porte, Colomiers (FR)

(73) Assignee: Airbus France, Toulouse (FR)

(*) Notice: Subject to any disclaimer, the term of this patent is extended or adjusted under 35 U.S.C. 154(b) by 226 days.

(21) Appl. No.: 10/274,967

(22) Filed: Oct. 22, 2002

(65) Prior Publication Data

US 2004/0045765 A1 Mar. 11, 2004

(30) Foreign Application Priority Data

Sep. 10, 2002 (FR) .......................................... 02 11183

(51) Int. Cl.[7] .............................................. G10K 11/00
(52) U.S. Cl. ..................... 181/210; 181/214; 181/213; 181/290
(58) Field of Search ................................ 181/210, 214, 181/288, 290, 292, 215, 222, 286, 293, 211, 212

(56) References Cited

U.S. PATENT DOCUMENTS

| | | | |
|---|---|---|---|
| 4,235,303 A | * | 11/1980 | Dhoore et al. .............. 181/214 |
| 4,258,823 A | | 3/1981 | Ganz et al. |
| 4,840,093 A | | 6/1989 | Goldman, Jr. |
| 4,969,535 A | | 11/1990 | Arcas et al. |
| 5,014,815 A | | 5/1991 | Arcas et al. |
| 5,025,888 A | | 6/1991 | Arcas et al. |
| 5,151,254 A | * | 9/1992 | Arai et al. ................... 422/180 |
| 5,581,054 A | * | 12/1996 | Anderson et al. ........... 422/180 |
| 5,603,471 A | | 2/1997 | Armstrong |
| 6,123,170 A | | 9/2000 | Porte et al. |
| 6,290,021 B1 | * | 9/2001 | Strandgaard ................ 181/213 |

FOREIGN PATENT DOCUMENTS

| | | |
|---|---|---|
| EP | 0572725 | 12/1993 |
| EP | 1167185 | 1/2002 |
| FR | 2378176 | 8/1978 |
| FR | 2767560 | 2/1999 |
| GB | 736267 | 9/1955 |

OTHER PUBLICATIONS

French Novelty Search Report dated May 26, 2003.

* cited by examiner

Primary Examiner—Robert E. Nappi
Assistant Examiner—Renata McCloud
(74) Attorney, Agent, or Firm—Stevens, Davis, Miller & Mosher, LLP

(57) ABSTRACT

Tubular acoustic attenuation piece for an aircraft jet engine air intake.

According to the invention, said tubular piece (1) is made up of shells (2) with a cellular core (5) assembled only by external fish plate strips (8), the facing edges (6) simply being edge faces of said shells (2) forming slots (9) between them.

13 Claims, 3 Drawing Sheets

TUBULAR ACOUSTIC ATTENUATION PIECE FOR AN AIRCRAFT JET ENGINE AIR INTAKE

The present invention relates to a tubular acoustic attenuation piece for an aircraft jet engine air intake.

It is known that jet engines with which aircraft are fitted are sources of noise at a very high level (often in excess of 130 decibels). That is particularly troublesome if a jet engine is located near to an inhabited area, for example when an aircraft takes off or lands. Environmental standards, which are becoming increasingly strict, dictate that the level of noise from a jet engine be limited to below a regulation threshold so as to limit the acoustic disturbance perceived by the inhabitants of said area. This regulation threshold is sometimes lowered still further during the night-time, which means that the noisiest aircraft can neither land nor take off, and this is a constraint, or even a loss of potential income, for the airlines which operate such aircraft. In consequence, it is desirable to reduce the level of acoustic emissions of such a jet engine to below said lowered regulation threshold so as to be able to operate at any time of the day or night.

In the known way, the level of noise emitted by an aircraft jet engine can be reduced by arranging, on the interior surface of the air intake of said jet engine, a cellular-core sandwich structure tubular piece, of which the face facing the inside of said air intake is formed of a permeable material allowing air to pass between said air intake and the cells of said cellular-core sandwich structure so that these cells can trap some of the sound waves and thus reduce the level of noise emitted to the outside by the jet engine. However, for ease of construction and fitting, this cellular-core sandwich structure piece is often made as several shells, each of which forms a longitudinal part of said tubular piece and which are assembled by means of longitudinal fish plates which join the facing lateral edges of adjacent shells together.

Such fish plates generally comprise a longitudinal fish plate strip arranged on the external side of said tubular piece and a longitudinal fish plate strip arranged on the internal side thereof. The internal longitudinal fish plate strips constitute areas of the interior surface of the air intake in which, on the one hand, the noise is not absorbed and, on the other hand, the sound waves are reflected, thus having the effect of greatly degrading, in terms of noise level reduction, the performance of said piece by comparison with a monolithic piece.

Furthermore, as can be seen for example in the documents of the prior art U.S. Pat. No. 4,840,093, U.S. Pat. No. 4,969,535, U.S. Pat. No. 5,014,815, U.S. Pat. No. 5,025,888 and EP-1 167 185, the lateral edges of the adjacent shells for securing are configured in a special way, for example thinning them continuously or stepwise, or inserting a densified cellular core there, etc. In any case, these configurations are lengthy, tricky and expensive.

Starting out from the principle that attempts made hitherto at obtaining acoustic insulation which is as undegraded as possible at the longitudinal connections between said adjacent shells are relatively in vain and that they lead to high costs, the object of the present invention is a multi-shell tubular acoustic attenuation piece that is simple, easy to manufacture and also not only leads to acoustic degradation that is no greater than that caused in the known multi-shell pieces but is also entirely comparable, as far as acoustic performance is concerned, with monolithic pieces. To this end, according to the invention, the tubular acoustic attenuation piece for a jet engine air intake, comprising:

at least two shells, each of which forms a longitudinal part of said tubular piece and which are connected along their longitudinal edges to form said piece, the wall of each of said shells consisting of a permeable internal skin, of an impermeable external skin and of a cellular core inserted between said internal and external skins; and for each connection between two longitudinal edges of two adjacent shells, an external longitudinal fish plate strip arranged on the side of the external skins of said adjacent shells, straddling said connection, and secured to said external skins, is notable in that:

said external fish plate strips alone secure said shells together and are fixed to the latter by fixing means which are not visible on the side of said internal skins;

each of said longitudinal connection edges consists of an edge face of said corresponding shell, along which edge face the cellular core of this shell has a marginal area of the same thickness as the rest of said cellular core but which can be damaged, so that said shell, corresponding with said marginal area, has acoustic attenuation which is not as good as in the remainder of said shell;

two facing longitudinal edges of two adjacent shells leave a slot between them; and the sum of the width of said slot and of the widths of the two facing marginal areas is at most equal to 15 mm.

The present invention is based on the experimental observation by the applicant company who found that, provided there is no projection (fish plate, fixing means, etc.) on the internal skin of said shells and provided that an upper limit (15 mm) on said sum of the widths is adhered to, it was possible, regardless of the jet engine concerned, to obtain good acoustic attenuation with longitudinal connection edges which are assembled with clearance (the slot) and along which said cellular core is simply cut (which opens up cells of said core and creates damaged marginal areas with reduced attenuation capability).

Thus, the longitudinal connection edges of the tubular acoustic attenuation piece according to the present invention entail no lengthy, tricky and expensive preparation such as gradual or stepwise thinning for example or partial replacement of the cellular core with a denser cellular core. The costs of manufacture of the tubular piece according to the invention are therefore reduced to a minimum.

On the inside of said tubular piece according to the present invention, the internal fish plate strips can be eliminated and the only things visible there are therefore said slots, the narrow width of which may just correspond to a mounting and operating clearance.

Said means for fixing said external fish plate strips may be blind bolts passing only through said external skin and partially housed in said cellular core. As an alternative, they may consist of adhesive.

In order to reduce the effect of the presence of said narrow slots on the inside of the tubular piece according to the invention still further, it is advantageous for these to be filled, at least on the inside, with a flexible seal, for example made of polysulfide mastic.

As a preference, to avoid delamination of the edges of said shells, said longitudinal connection edges (the edge faces) are covered with a folded continuation of at least one of said internal and external skins.

Since, in order to be able to eliminate the internal fish plate strips and their acoustic inconveniences, it is necessary for said external fish plate strips to be able by themselves to secure said shells together, said external fish plate strips need to allow connections to be made the firmness and rigidity of which are such that the loadings applied to said tubular piece do not cause deformation of the connections that is appreciably greater than the deformation that would occur if said tubular piece were monolithic.

To this end, said external fish plate strips, which are, for example, made of metal, may, on their opposite external face to said external skins, carry stiffening means, such as individual transverse stiffeners or longitudinal stiffening strips at least partially covering said external fish plate strips. Such stiffening strips may comprise at least one cellular core so as to form a sandwich composite structure able possibly to attenuate the sound waves passing through said connecting slots.

It is advantageous for said external skins to be thicker than said internal skins so as to transmit the high loads to which said tubular piece is subjected. In addition, the parts of the external skins of said shells to which said external longitudinal fish plate strips are fixed may be reinforced.

The figures of the appended drawing will make it easy to understand how the invention may be embodied. In these figures, identical references denote similar elements.

Figure 2:
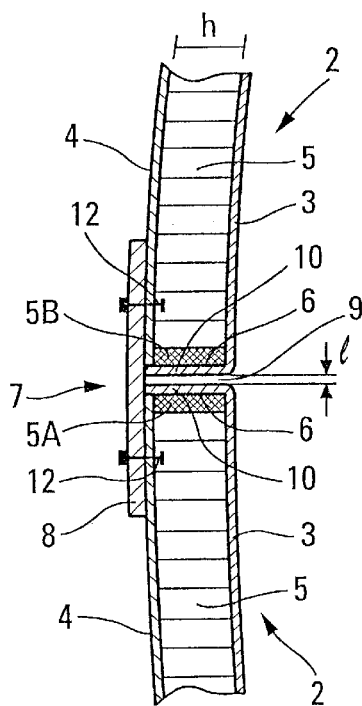
FIG. 2 illustrates schematically, in part section on a larger scale, the connection between two shells of the tubular piece of FIG. 1.
Figure 3:
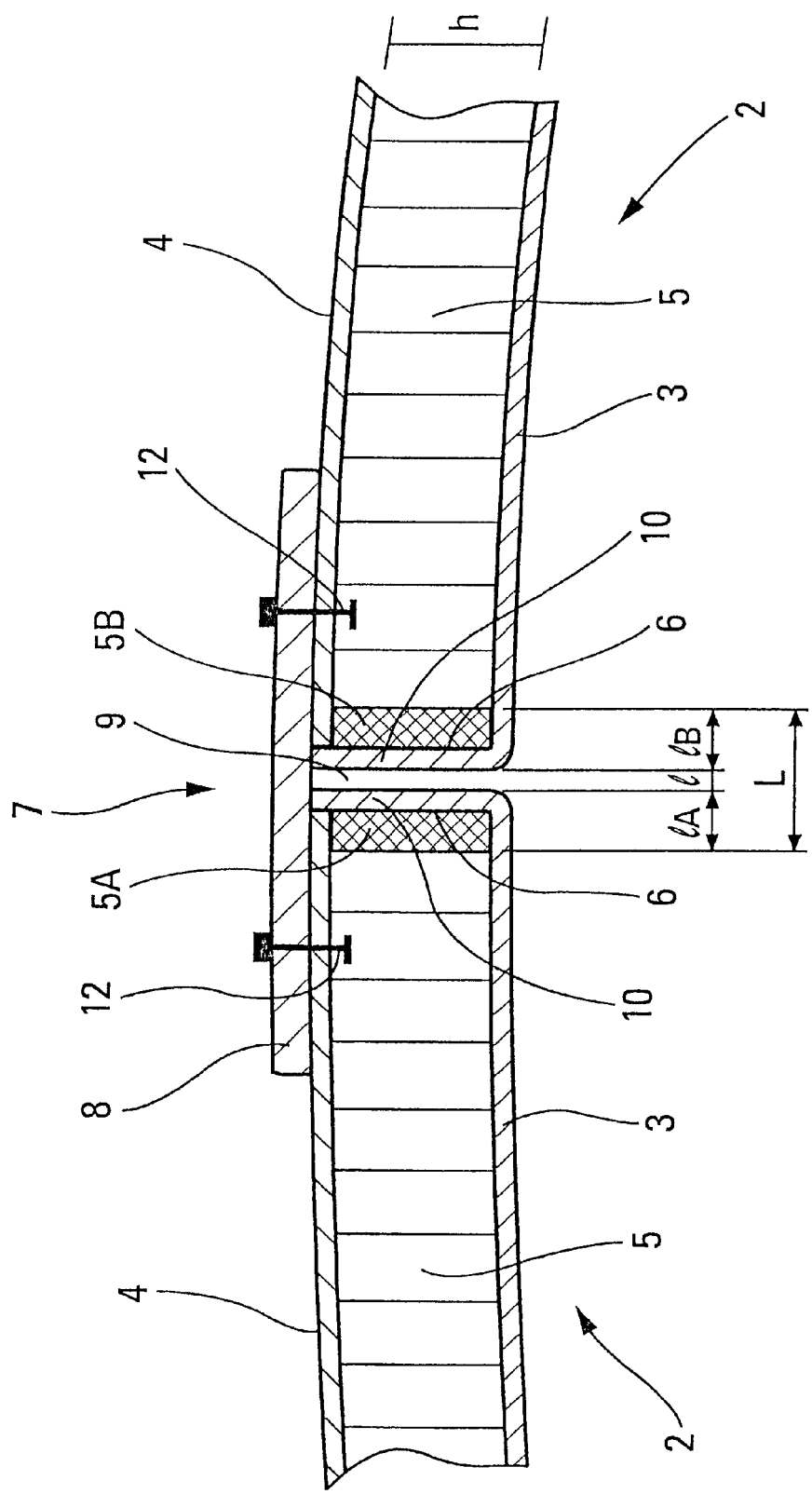

FIG. 3 corresponds to an enlarged view of the connection of FIG. 2.

Figure 4:
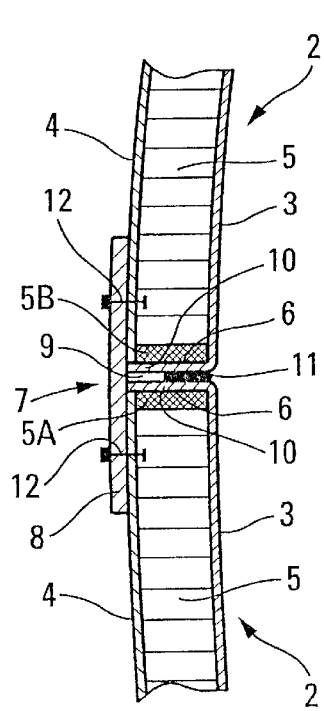
Figure 5:
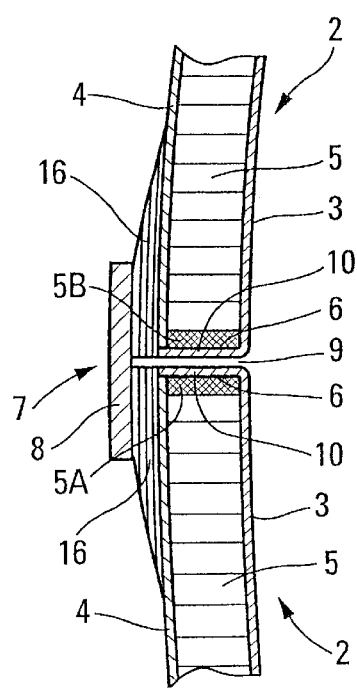
Figure 6:
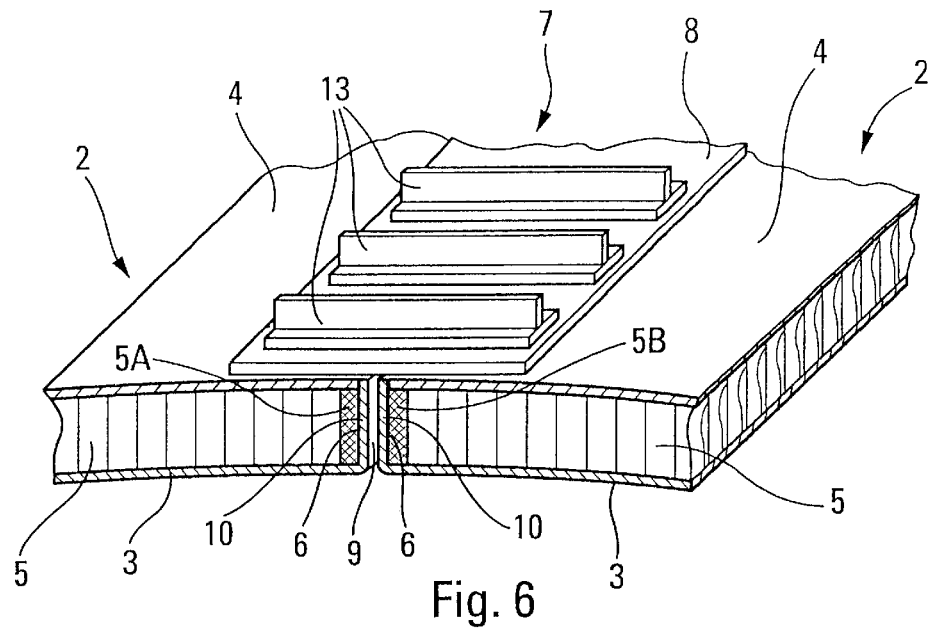
Figure 7:
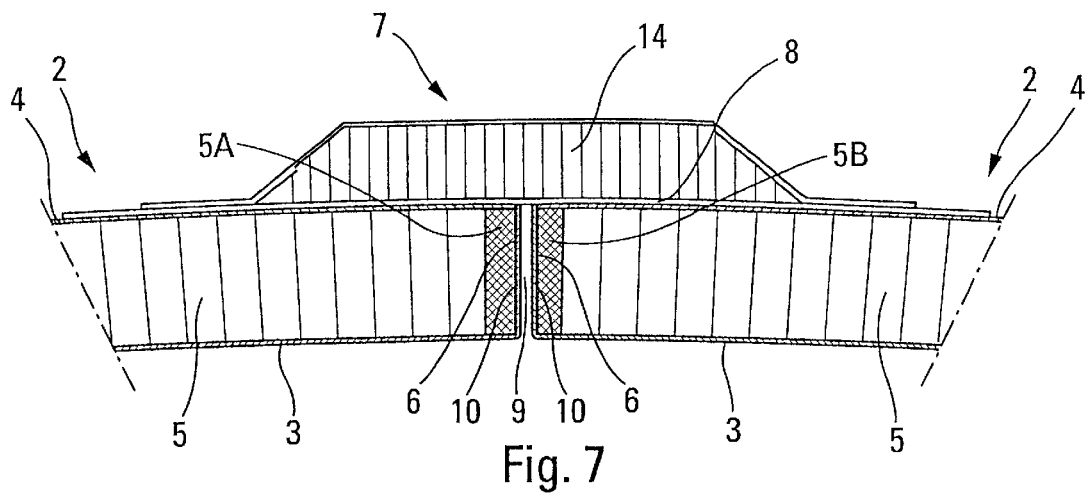
Figure 8:
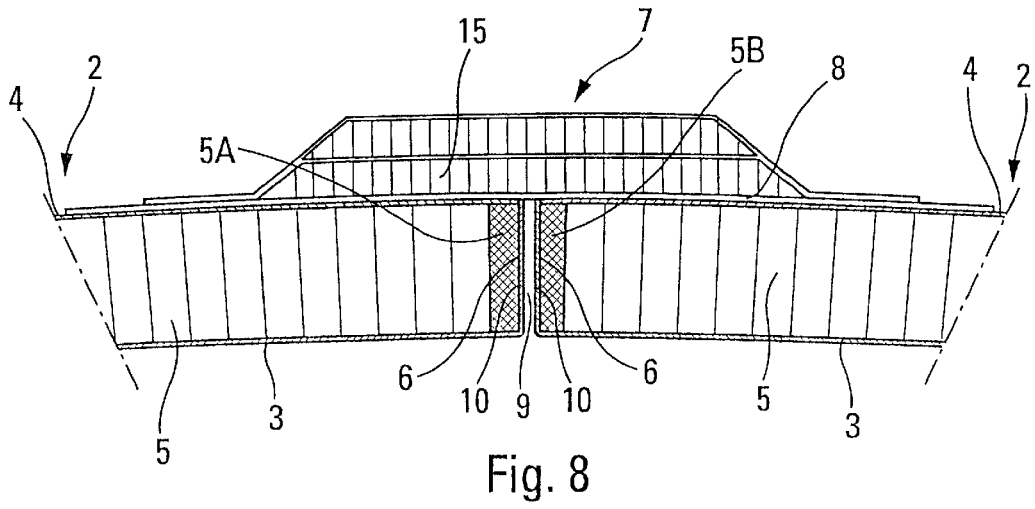

FIGS. 4 to 8 schematically illustrate alternative forms of embodiment of the connection of FIG. 2, FIGS. 4, 5, 7 and 8 being sections similar to the latter figure, whereas FIG. 6 is a sectioned perspective view.

Figure 1:
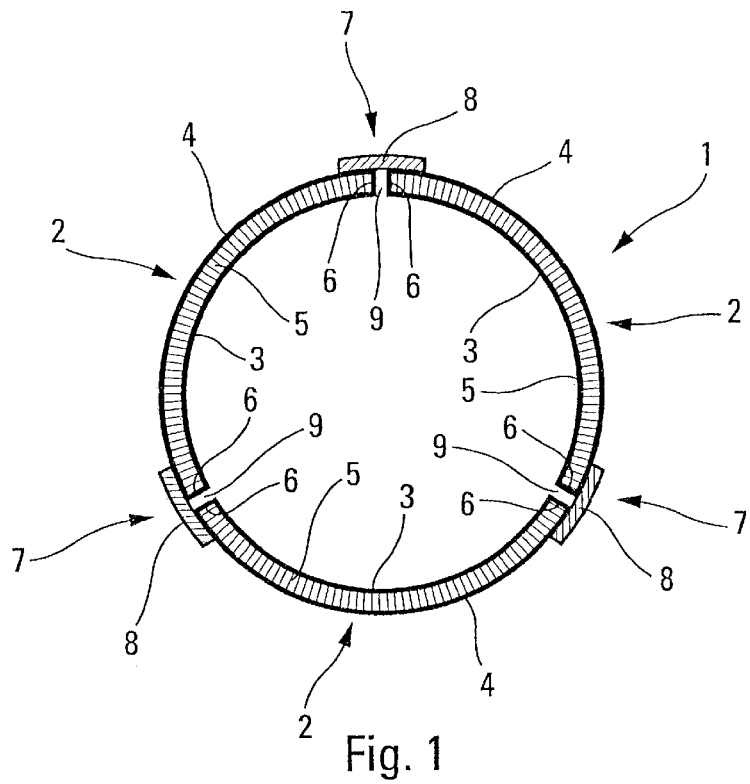
FIG. 1 is a schematic cross section of an exemplary embodiment of the tubular acoustic attenuation piece for a jet engine air intake according to the present invention.

The tubular acoustic attenuation piece 1 for the air inlet of a jet engine (not depicted), depicted in schematic cross section in FIG. 1 by way of example and according to the present invention, consists of three identical shells 2 each of which longitudinally forms one third of said piece 1.

The wall of each of said shells 2 is made of a known acoustic attenuation structure comprising a permeable internal skin 3, an impermeable external skin 4, preferably thicker than the internal skin 3, and a cellular core 5 inserted between said internal and external skins 3 and 4.

Along their facing longitudinal edges 6, said shells 2 are secured together in pairs by three connections 7 arranged at 120° to one another, at the periphery of the tubular piece 1.

Each connection 7 comprises an external longitudinal fish plate strip 8, running the length of the piece 1 and arranged on the side of the external skins 4 of the adjacent shells 2. Each fish plate strip 8 is arranged straddling the facing longitudinal edges 6 and is secured to the external skins 4 of the two adjacent shells 2 concerned.

Each longitudinal edge 6 of a shell 2 simply consists of an edge face (not specially configured) of said shell where the cellular core has the same thickness h and the same cells as the rest of the cellular core 5 of the wall 3, 4, 5. However, along each longitudinal edge 6, said cellular core comprises a marginal area 5A, 5B (see FIGS. 2 and 3) in which the cells are damaged as a consequence of the process of manufacturing the shells 2. The result of this is that these shells have, corresponding to said marginal areas 5A, 5B, less acoustic attenuation.

Furthermore, the two facing longitudinal edges 6 of two adjacent shells 2 leave a slot 9 of width between them.

The only special configuring of the edge faces 6 there might be is that they are covered by a folded continuation 10 or one or other of the skins 3 or 4, preferably a continuation of the internal skin 3. The coverings 10 have the advantage of preventing the edge faces 6 from delaminating.

The applicant company has found that, whatever the jet engine in the air inlet of which the tubular piece 1 is arranged, the acoustic attenuation performance of this tubular piece is practically identical to that of a monolithic piece with no connection 7, provided that the sum L of the width l of the slot 9 and of the slots 1A and 1B of the facing marginal areas 5A and 5B (see FIG. 3) is equal to 15 mm at most.

As illustrated by FIG. 4, a seal 11 may be arranged in the slots 9, on the inside. Such a seal may be made of PR (polysulfide mastic), a material often used in aeronautics. The seals 11 not only allow the noise attenuation performance of the piece 1 to be improved by improving the air flow at the internal surface of the connections 7, but also plays a part in preventing delamination of the edge faces 6 of the shells 2.

Of course, each external fish plate strip 8 is sized to allow the loads that arise in the corresponding connection 7 to be transmitted. The fish plate strips 8 may be made of metal and fixed to the shells 2 by one or more coats of adhesive (not visible in the figures) or by blind, non-penetrating bolts 12, passing only through the external skins 4 and partially housed in the cellular cores 5. Thus, said fixing means (adhesive or blind bolts) are not visible on the internal side of the-skins 3 and cannot disturb the acoustic attenuation properties of the piece 1.

Particularly when the fish plate strips 8 consist of thin sheet, one or more transverse stiffening elements 13, for example with an I-section or T-section, are fixed to the external face of said strips to improve the rigidity of the connections 7 (see FIG. 6). As an alternative (see FIGS. 7 and 8), said fish plate strips 8 may be reinforced with longitudinal stiffening strips 14 or 15 at least partially covering said fish plate strips 8 and themselves having a cellular-core sandwich structure similar to that of the walls 3, 4, 5 of the shells 2.

In the alternative form of embodiment of FIG. 5, the parts of the external skins 4 to which the external fish plate strips 8 are fixed are reinforced. When said external skins 4 are made of fiber-matrix composite, the reinforcements 16 are themselves made of said composite. Thus, not only is the rigidity of the shells 2 increased near the connections 7, thus increasing their rigidity, but the secureness of said connections 7 is also increased.

What is claimed is:

1. A tubular acoustic attenuation piece for a jet engine air intake, comprising:

at least two shells, each of which forms a longitudinal part of said tubular piece, said at least two shells being connected along longitudinal edges of facing longitudinal marginal areas to form said tubular piece, each of said shells having a wall structure with a permeable internal skin and an impermeable external skin and having a cellular core disposed between said internal and external skins, said longitudinal marginal areas having the same thickness as the rest of said cellular core, and two facing longitudinal connection edges of two adjacent shells having a slot between them, the sum of the width of said slot and of the widths of two facing marginal areas being at most equal to 15 mm;

an external longitudinal fish plate strip is arranged, at each connection between the longitudinal edges of two adjacent shells, on the external skins side of said adjacent shells, straddling said connection, and secured to said external skins, said external fish plate strip alone securing said two adjacent shells together and being fixed to said two adjacent shells by a fixing structure which is not visible on the internal skins side of said two adjacent shells; and a stiffener at least partially covering an external face of said fish plate strip.

2. The tubular piece as claimed in claim 1, wherein said fixing structure comprises blind bolts passing through said external skin and partially housed in said cellular core.

3. The tubular piece as claimed in claim 1, wherein said fixing structure comprises adhesive.

4. The tubular piece as claimed in claim 1, wherein, at least on the inside of said two adjacent shells, said slot is filled with a seal.

5. The tubular piece as claimed in claim 4, wherein said seal comprises polysulfide mastic.

6. The tubular piece as claimed in claim 1, wherein said longitudinal connection edges are covered with a folded continuation of at least one of said internal and external skins.

7. The tubular piece as claimed in claim 1, wherein said external skins are thicker than said internal skins.

8. The tubular piece as claimed in claim 1, wherein parts of the external skins of said shells to which said external longitudinal fish plate strips are fixed are reinforced.

9. The tubular piece as claimed in claim 1, wherein said longitudinal stiffening strips comprise at least one cellular core so as to form a sandwich composite structure.

10. The tubular piece as claimed in claim 9, wherein said longitudinal stiffening strips are operable to attenuate sound waves passing through said slot.

11. The tubular piece as claimed in claim 1, wherein said stiffener is one of a longitudinal strip and a transverse strip.

12. The tubular piece as claimed in claim 1, wherein the part of said external skin to which said external fish plate strip is fixed is reinforced with a reinforcement structure.

13. The tubular piece as claimed in claim 12, wherein said external skin and said reinforcement structure are made of a same composite material.

* * * * *